Oct. 17, 1939.　　　　L. E. POOLE ET AL　　　　2,176,188
TUBE FLARING MACHINE
Filed Sept. 13, 1937　　　　7 Sheets-Sheet 1
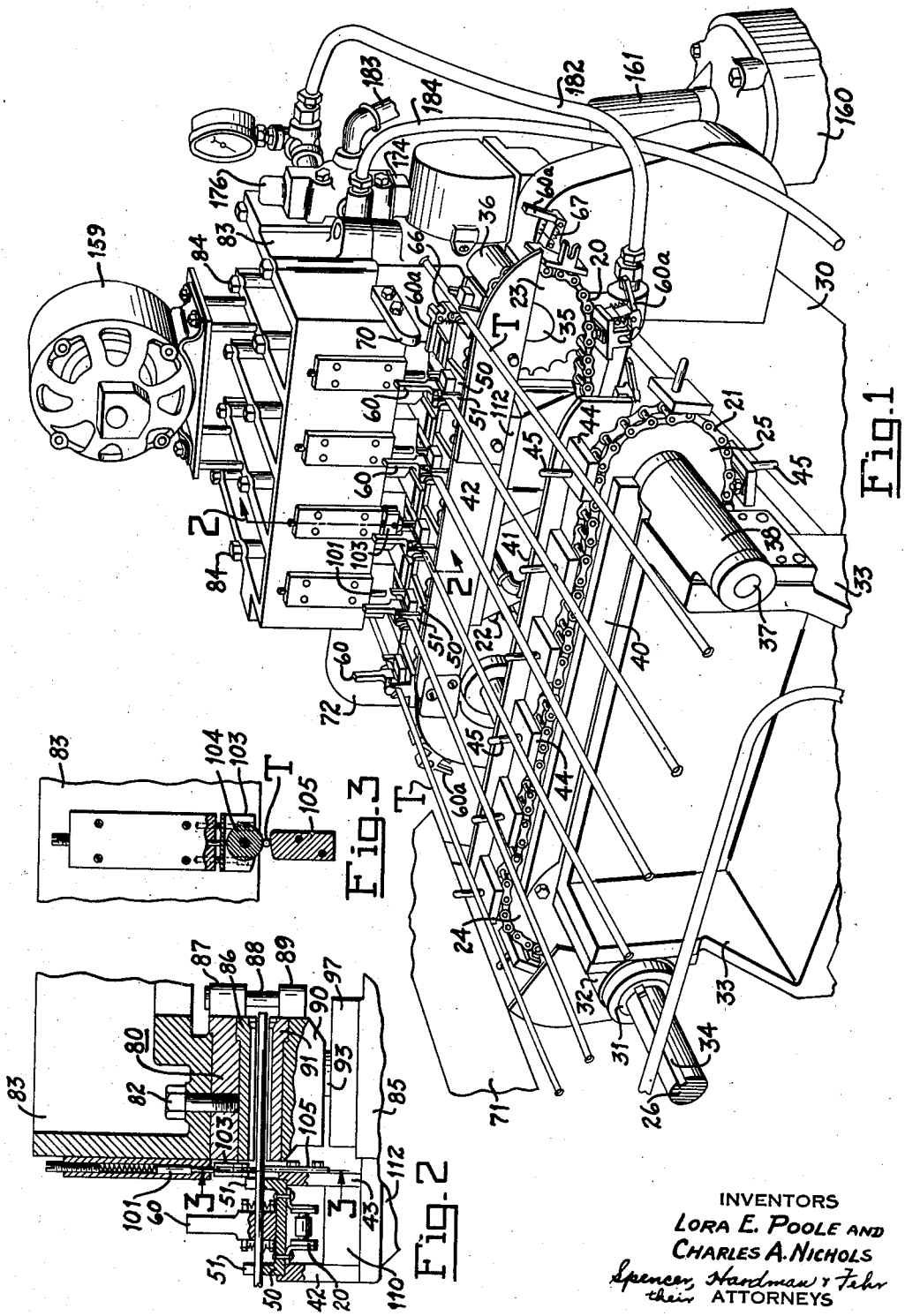
INVENTORS
LORA E. POOLE AND
CHARLES A. NICHOLS
Spencer, Hardman & Fehr
their ATTORNEYS

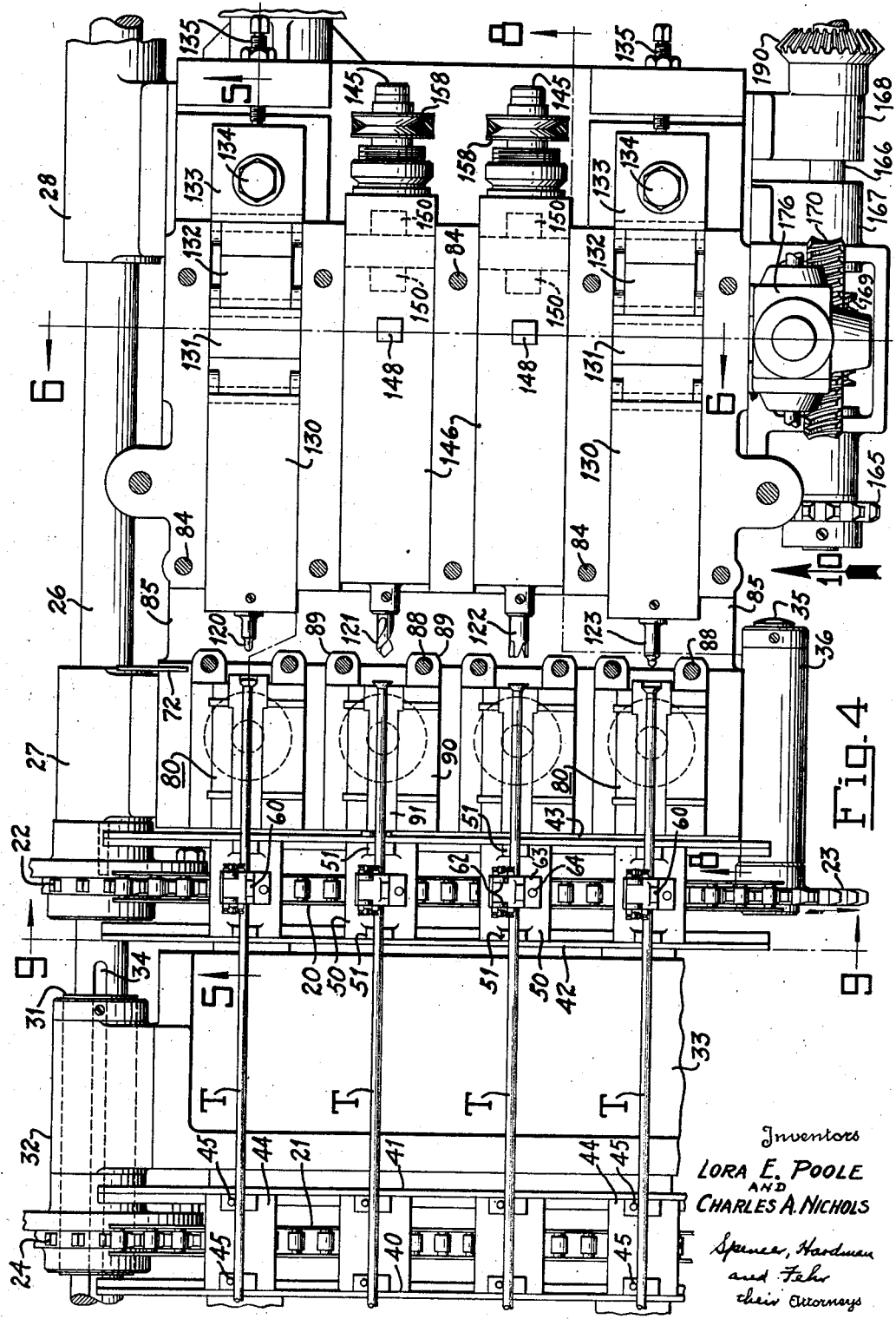

Oct. 17, 1939.    L. E. POOLE ET AL    2,176,188
TUBE FLARING MACHINE
Filed Sept. 13, 1937    7 Sheets-Sheet 3

Inventors
LORA E. POOLE
AND CHARLES A. NICHOLS

Spencer, Hardman & Fehr
their Attorneys

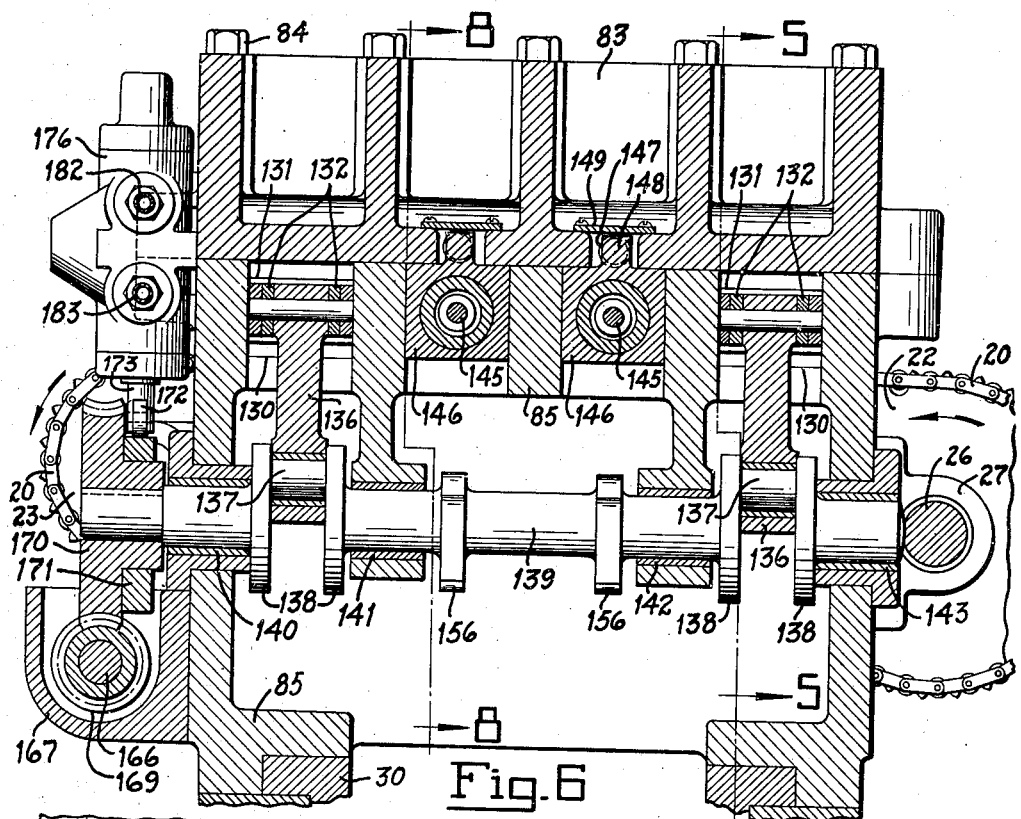
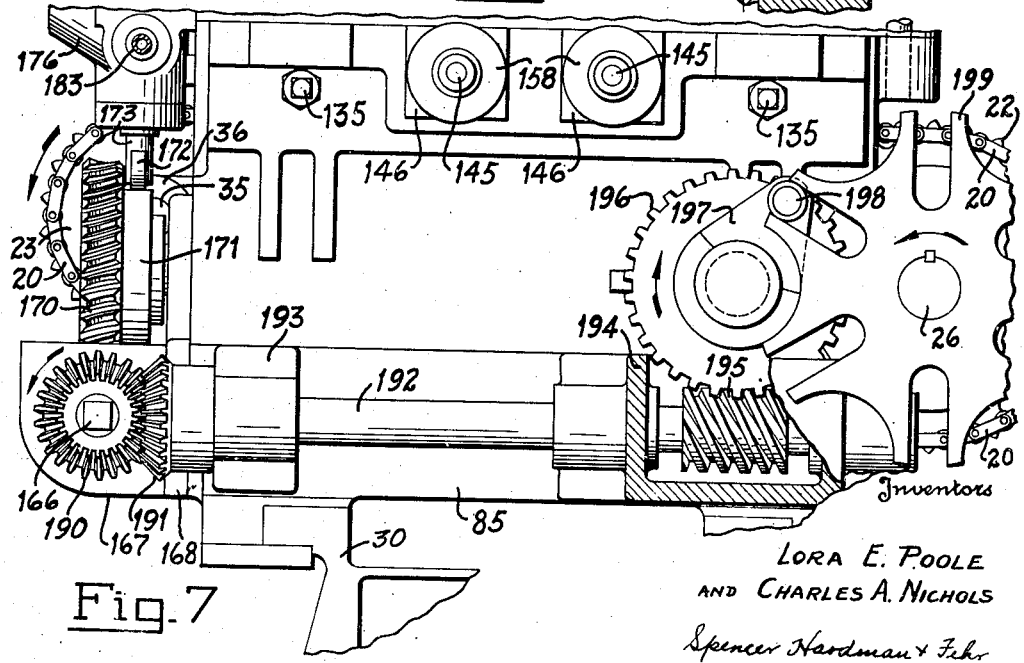

Inventors
LORA E. POOLE
AND CHARLES A. NICHOLS

Spencer Hardman & Fehr
their Attorneys

Patented Oct. 17, 1939

2,176,188

UNITED STATES PATENT OFFICE 2,176,188

TUBE FLARING MACHINE

Lora E. Poole and Charles A. Nichols, Anderson, Ind., assignors to General Motors Corporation, Detroit, Mich., a corporation of Delaware Application September 13, 1937, Serial No. 163,532

13 Claims. (Cl. 29—51)

This invention relates to the manufacture of tubing such as used in gasoline and oil lines of an automotive vehicle.

It is an object of the invention to provide apparatus for economically and efficiently flaring the ends of tubing so as to adapt them for suitable tube fittings and coupling devices, for example those specified by S. A. E. standards.

These and other objects of the invention are accomplished in the disclosed embodiment thereof which comprises a conveyor carrying a plurality of workholders each for receiving a length of tubing, a plurality of stationary workholders each for clamping a length of tubing adjacent its end to be flared, a plurality of tools for performing operations upon a plurality of lengths of tubing simultaneously, and an operating mechanism for causing the stationary workholders to clamp lengths of tubing while the conveyor is at rest, and the various tools to perform flaring operations upon the lengths of tubing.

Further objects and advantages of the present invention will be apparent from the following description, reference being had to the accompanying drawings wherein a preferred embodiment of the present invention is clearly shown.

In the drawings:

Fig. 1 is a fragmentary perspective view of the apparatus embodying the present invention.

Fig. 2 is a fragmentary sectional view taken substantially on the line 2—2 of Fig. 1.

Fig. 3 is a fragmentary sectional view on the line 3—3 of Fig. 2.

Fig. 4 is a plan view of the apparatus shown in Fig. 1 taken along line 4—4 of Fig. 5.

Fig. 6 is a fragmentary sectional view on the line 6—6 of Figs. 4, 5 and 8.

Fig. 7 is a fragmentary end elevation looking in the direction of the arrow 7 of Figs. 5 and 8.

Conveyor

Figure 5:
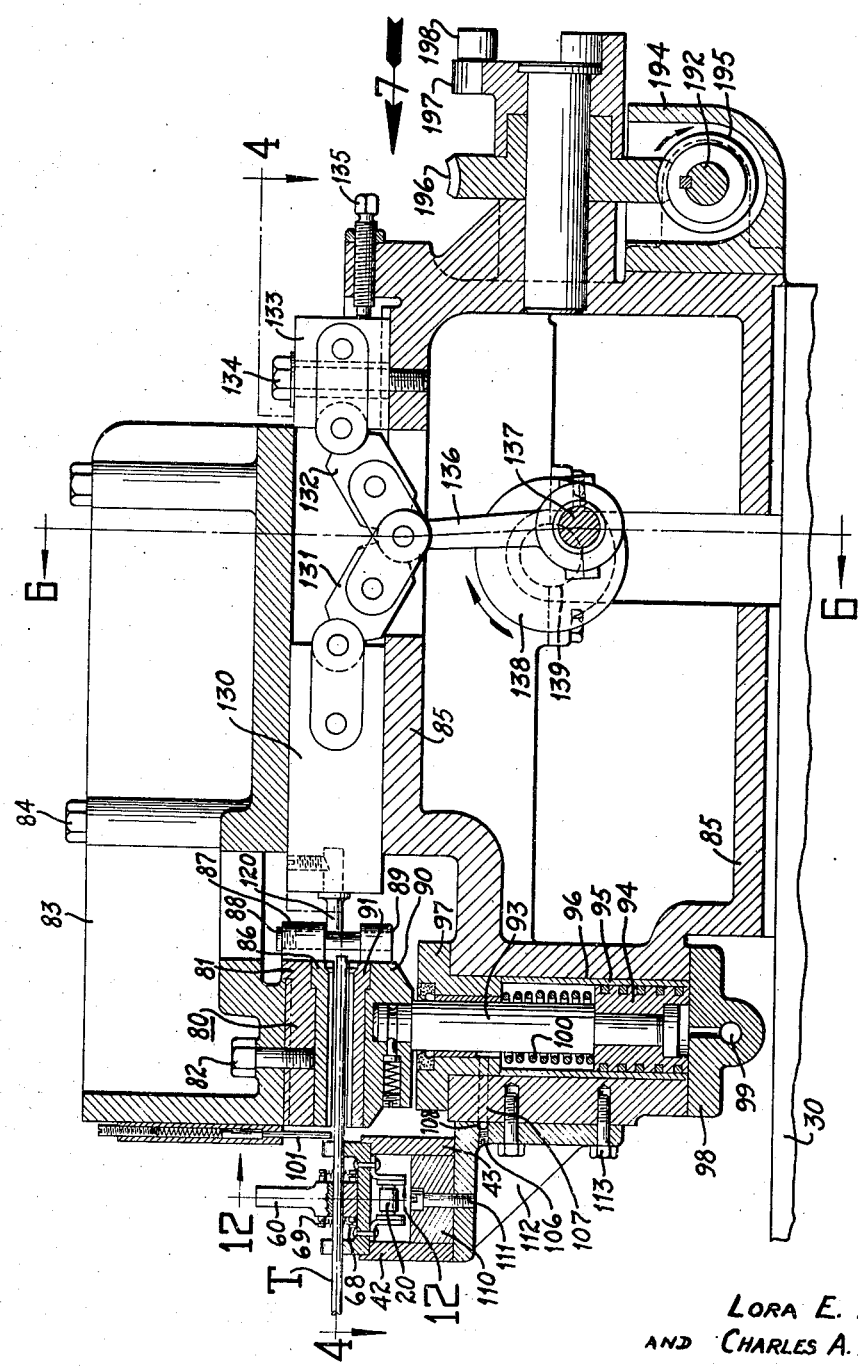
Fig. 5 is a sectional view on the line 5—5 of Figs. 4 and 6.

Referring to Fig. 1 the conveyor comprises a pair of chains 20 and 21. Chain 20 passes around sprocket wheels 22 and 23, and chain 21 around sprocket 24 and 25. Sprocket 22 is keyed directly to a shaft 26 journaled in bearings 27 and 28 provided by the machine frame 85. Sprocket 24 is keyed to a sleeve 31 journaled in a bearing 32 which is carried by a bracket 33 which may be slid along the frame 30 in a direction parallel to the shaft 26 which may extend lengthwise of the frame 30 and for the full length thereof. The sleeve 31 surrounds and provides a journal for the shaft 26 and is drivingly connected with the shaft 26 by a key which slides in a groove or key way 34 provided by the shaft 26. This construction permits locating the chain 21 in parallelism with the chain 20 but at different distances therefrom depending upon the length of the tubing to be operated upon. The sprocket 23 is fixed to an idle shaft 35 journaled in a bearing 36 provided by the frame 85. The sprocket 25 is fixed to an idle shaft 37 journaled in a bearing 38 fixed to the bracket 33.

The bracket 33 provides the support of two rails 40 and 41 and the machine frame 85 provides for the support of two rails 42 and 43, along which the lengths of tubing T are slid by the conveyor. The conveyor chain 21 carries a plurality of equi-distant pads 44 each carrying one or more pegs 45 for engaging a tube length T.

Figures 11, 12:
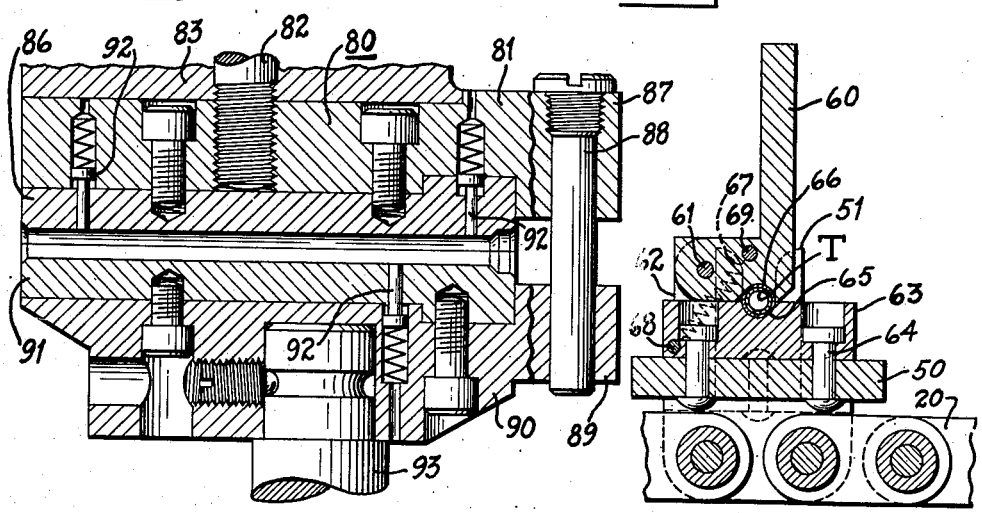
Fig. 11 is a fragmentary sectional view on an enlarged scale showing the details of the stationary workholder shown on a smaller scale in Figs. 2 and 5.
Fig. 12 is a fragmentary sectional view on an enlarged scale of a portion of the conveyor showing one of the conveyor workholders in section. This section is on the line 12—12 of Fig. 5.

The conveyor chain 20 carries a plurality of equidistant pads 50 each providing a workholder for receiving a length of tubing T. Each workholder pad is provided with two lugs 51, see Figs. 1, 2, 4 and 12. Provided with aligned notches for receiving a tube T, it will be observed that the notched lugs 51 support a tube T lengthwise of the machine and in such manner that it will at the same time be engaged by a pin 45 of the pad 44 which is in longitudinal alignment therewith. Since the two chains 20, 21 move simultaneously and at the same speed as the tubes in parallelism across the frame of the machine, each tube T is held within a pair of notched lugs 51 by a clamping lever 60 shown best in Figs. 2 and 12. Lever 60 is journaled on a pin 61 and is carried by a pair of spaced ears 62 provided by the pad 50 integral with a block 63 which is attached by rivets 64 to the pad 50. The block 63 has a groove 65 which receives the tube T when it is located within the notched lugs 51. The lever 60 is provided with a groove 66 which likewise receives the tube T when the lever 60 is in the position shown in Fig. 12. The lever 60 is held in this position by a spring 67 attached at one end to a pin 68 provided by block 63 and at the other end to a pin 69 provided by a lever 60. It will be noted that the center line of the spring 67 is located as shown in Fig. 12 in such manner that the lever 60 will be urged in a clockwise direction around its pivot 61 thereby clamping the tube T between the block 63 and the lever 60 with yielding friction exerted by the spring 67. When it is desired to release the work the lever, as shown in Fig. 12, is moved counter-clockwise sufficiently to cause the center line of the spring to be moved to the left of the pin 61 whereby the lever will be held in non-clamping position. The levers marked 60a in Fig. 1 are in non-clamping position. These levers have been automatically thrown in that position as a result of their striking a horizontal bar 70 supported by the machine and located in the path of movement of the lever 60. The lever 60 having been moved in a non-clamping position indicated at 60a in Fig. 1, the released tube lengths T are free to drop by gravity from the conveyor into a suitable container not shown. The tube lengths T are fed to the conveyor by an operator who receives the tubes from an inclined shelf 71, a fragment of which is shown adjacent the left end of Fig. 1. The operator then places the tube lengths upon the conveyor and pushes each one toward the right as viewed in Figs. 1 and 4 until the end of the tube strikes a plate limit 72 shown on the upper side of Figs. 1 and 4. Then the operator moves the clamp lever 60 from its position shown in 60a to that shown at 60 at the upper and left side of Fig. 1. The tube T is then ready to proceed through the machine and be operated upon by whatever tools the machine may be provided with.

Stationary workholder

In addition to the moving workholder provided by the conveyor there are a plurality of stationary workholders equal in number to the number of flaring operations performed simultaneously by the machine. In the disclosed embodiment of the present invention there are four flaring tools, hence four stationary workholders, the lower clamping members of which are shown in the center part of Fig. 4 and the details of which are shown best in Figs. 5 and 11.

Each stationary workholder may be designated in its entirety by numeral 80 and it comprises an upper and stationary bed plate 81 secured by one or more screws 82 to an upper frame 83 secured by bolts 84 to the lower frame 85 which in turn rests upon the main frame 30. The upper bed plate 81 carries an upper clamping jaw 86 and is provided with an apertured ear 87 carrying a pilot pin 88 which slides through an aligned apertured hole in a lug 89 provided by the lower bed plate 90. The bed plate 90 carries a lower clamp 91. The two clamping jaws 86 and 91 are provided with spring pressed ejector pins 92 intended to dislodge the work from contact with the clamping jaws 86 and 91 when they are separated. The clamping jaw bed plate 90 is swivelly supported by a piston rod 93 attached at its lower end to a piston 94 which slides in a cylinder 95 inserted in a suitable bore 96 provided by the frame 85. The bore 96 is closed at its upper end by a packing gland 97 through which the piston rod 93 passes and at its lower end by a plate 98 having a passage 99 communicating with a source of fluid pressure to be described later. A spring 100 urges the piston 94 downwardly to separate the clamping jaws 86 and 91 as shown in Fig. 5. Pressure is admitted to the lower end of cylinder 95 through the pass 99 raising the piston 94 against the compression of spring 100 to close the clamping jaws on the tube T preparatory to performing upon it.

In order to prevent back pressure due to the accumulation of pressure fluid escaping around the piston 94 into the upper part of cylinder 95, cooperating passages 107 and 108 are provided. Passage 107 opens into the cylinder at one end thereof and cooperates with the passage 108 at the other end thereof. A plug 106 at the other end of passage 108 is utilized to seal the passages from the atmosphere. Removal of plug 106 during the upward movement of piston 94 will permit ejection of the trapped fluid through the passages 107 and 108, whereupon the plug 106 may be replaced and normal operation may be resumed.

In order to be sure that the work will not cling to the clamping jaws 86 or 91 after they are separated, there is provided adjacent each stationary workholder 80 an additional ejecting means in the form of a spring pressed plunger 101 slidably secured to the upper frame 83. As shown in Figs. 2 and 3 one of the plungers 101, provided at its lower end with a bifurcated plate 103 carries a roller 104 adapted to bear upon the tube T and to urge the same against a plate 105 attached to the rail 43 as shown in Fig. 2. The parts 104 and 105 are so located that, when the tube T is engaged by them, the tube T will be held substantially midway between the clamping jaws 86 and 91 when they are separated as shown in Fig. 2.

As shown in Fig. 5 the rails 42 and 43 are secured to a metal strip 110 which is attached by screws 111 to a shelf 112 which is attached by screws 113 to the left-hand end of the lower frame 85. In this way the conveyor chain 20 is supported in a desired position above the machine frame 30.

Flare forming tools

Figure 13:
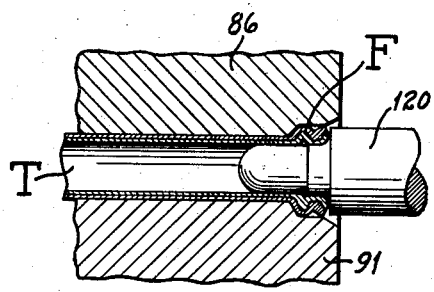
Figs. 13, 14, 15 and 16 are fragmentary sectional views on an enlarged scale showing, by way of example, the flaring operation which may be performed by a machine of this character.
Figure 14:
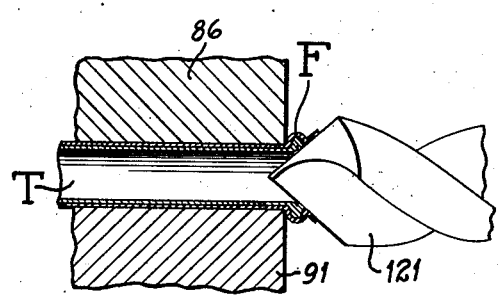
Figure 15:
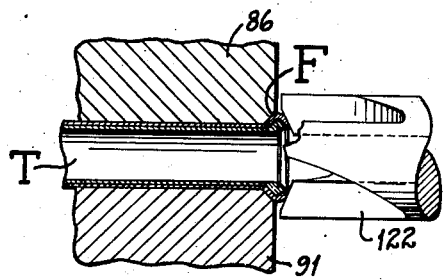
Figure 16:
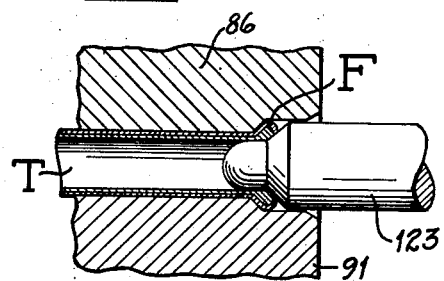

In the present machine operations are performed upon lengths of tubing T simultaneously by four different tools shown on an enlarged scale in Figs. 13, 14, 15, 16. Fig. 13 shows the tube T clamped between the jaws 86 and 91 and the effect of its being operated upon by tool 120 which causes the end of the tube T to be deformed to provide a thickened annular flange F. In Fig. 14 the flange F is being trimmed off internally by a rotary tool 121; and in Fig. 15 the flange is being trimmed externally by a rotary tool 122. In Fig. 16 the flange F is being coined into final shape by a tool 123. All of these tools move axially and tools 121 and 122 rotatively. In Fig. 4 these tools are shown supported by their respective tool holders. The non-rotatable tools, like tool 120 are each supported by a sliding block 130 shown in Fig. 5. Block 130 is connected by toggle link 131 and 132 with a stationary block 133 adjustably secured to the frame 85 by a screw 134 after having been located in the correct position by a stop screw 135. The toggle links are connected with a rod 136 which is connected with a crank pin 137 supported by crank discs 138 shown also in Fig. 6. The discs 138 are integral with a crank shaft 139 supported in bearings 140, 141, 142 and 143 provided by the frame 85 as shown in Fig. 6. Obviously, upward movement of the rod 136 as shown in Fig. 6 causes the toggle links 131 and 132 to approach a horizontal position thereby causing the bar 130 to move toward the work. Likewise downward movement of the rod 136 as shown in Fig. 5 causes the block 130 to be retracted from the work. Tool 123 is moved toward and away from the work in an identical mechanism.

Figure 8:
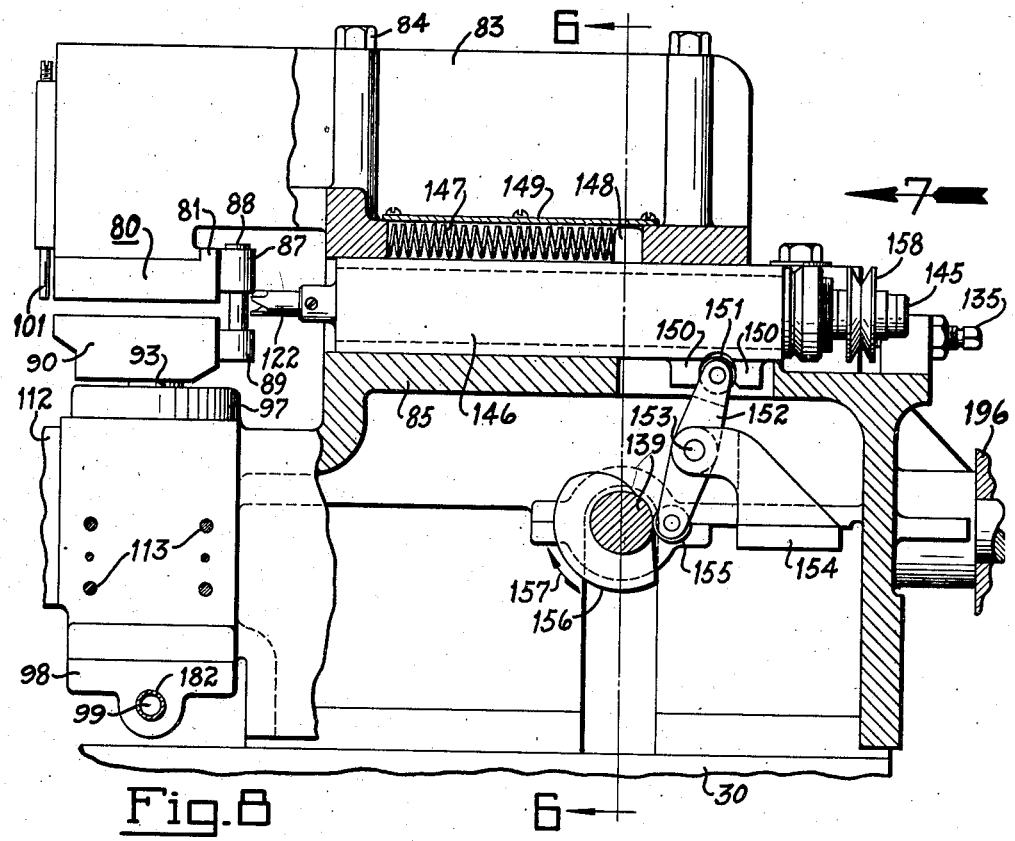
Fig. 8 is a sectional view taken on the line 8—8 of Figs. 4 and 6.
Figure 9:
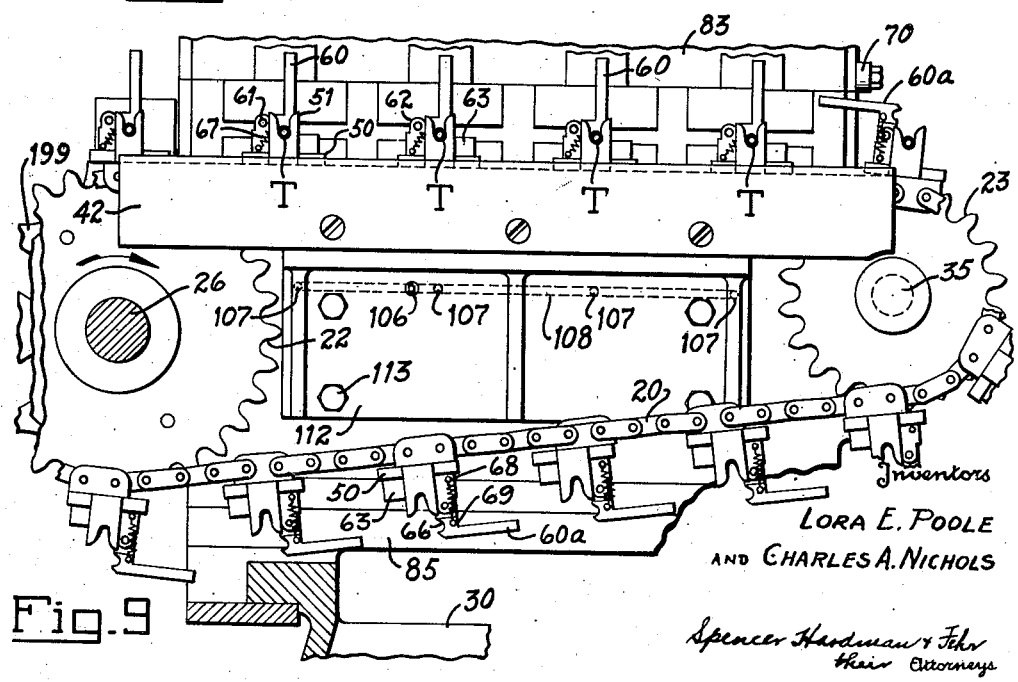
Fig. 9 is a sectional view taken on the line 9—9 of Fig. 4.

Referring to Figs. 4, 6 and 8, each of the rotary tools 121 or 122 is carried by a shaft 145 journaled in a bearing block 146 which is supported for horizontal sliding movement between the frame 85 and the frame 83 as shown in Figs. 6 and 8. Each bearing block 146 is held in retracted position by spring 147 which bears at one end against frame 83 and the other against the lug 148 attached to the block 146. The spring 147 is retained by the cover plate 149. The block 146 provided on its under side by spaced lugs 150 which receive between them a roller 151 carried by a lever 152 pivoted at 153 on a bracket 154 attached to the frame 85. The lower end of lever 152 carries a roller 155 which engages a cam 156 which is integral with the shaft 139 during rotation of the cam 156 as indicated by the arrow 157 the slide bar 146 is caused to move toward the left carrying with it its tool 121 or 122, against the work. Each tool holding shaft 145 carries a pulley 158 connected by suitable belt shown in Fig. 4 with an electric motor 159, see Fig. 1, which is supported upon the upper frame 83.

*Operating mechanism*

Figure 10:
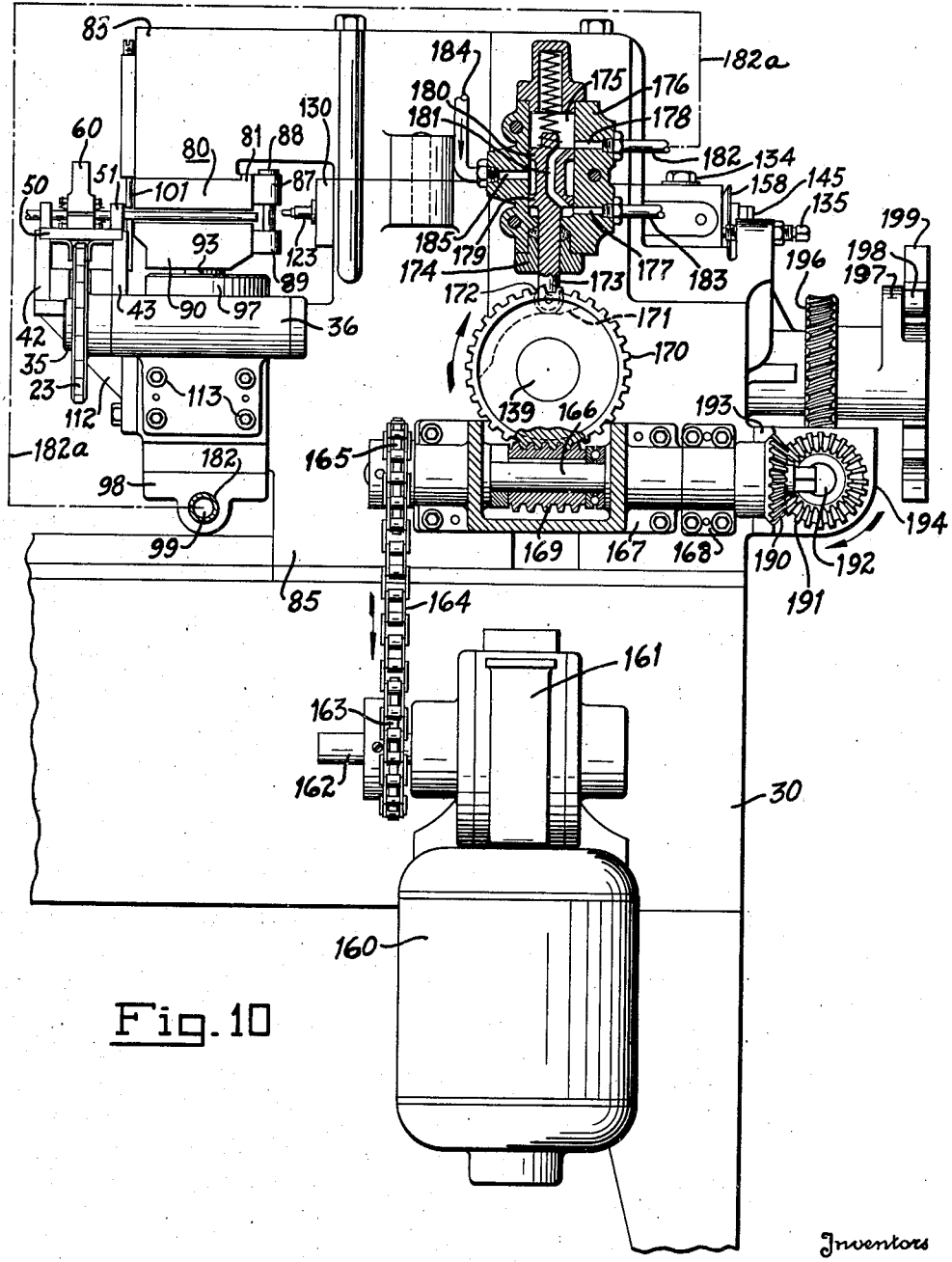
Fig. 10 is a fragmentary side elevation on a smaller scale looking in the direction of arrow 10 of Fig. 4.

As shown in Figs. 1 and 10 the machine frame 30 supports an electric motor 160 connected by a gear reduction 161 with a shaft 162 to which a sprocket wheel 163 is attached. Sprocket 163 is connected by chain 164 with a sprocket 165 carried by shaft 166 which is supported by a bracket 167 and a bracket 168 upon the side of frame 85. Shaft 166 carries a worm 169 which drives a worm gear 170 fixed to the shaft 139. Gear 170 drives a cam 171 engageable with a roller 172 on the lower end of the valve rod 173. Rod 173 extends through a packing gland 174 and into a valve chamber 175 provided interiorly of a valve casting 176, which is secured to frame 85 and 83. In a housing 176 is provided ports 177 and 178 and the rod 173 with annular flanges 179 and 180 which control these ports. There is a passage 181 which extends through the rod so as to provide communication in the chamber 175 between the space above the flange 180 and the space below the flange 179. The port 178 is connected by a pipe 182 represented in part by the dot-dash line 182a. Pipe 182 is connected with all four of the passages 99 which communicates with the cylinders 95 for elevating the clamping jaws 91. The port 177 is connected by a pipe 183 with a fluid reservoir (not shown) not under pressure with which the inlet of the fluid pressure pump is connected. This pump is not shown but is connected by a pipe 184 shown in Figs. 1 and 10 with a port 185 which is about midway between the ports 177 and 178 in the position of valve rod 173 shown in Fig. 10. Port 185 is cut off and ports 177 and 178 are connected hence pressure fluid is discharged from the cylinders 95 thereby permitting the springs 100 to move the piston 94 downwardly so as to separate the stationary workholder clamping jaws. When roller 172 engages the high part of the cam 171, the port 185 will be connected with the port 178 and the port 178 disconnected from the port 177 whereupon pressure fluid is delivered through pipe 182 through the cylinders 95 in order to elevate the clamping jaws 91 and clamp the tubes T in the stationary workholder.

Referring again to Figs. 6, 7 and 10 the shaft 166 drives a beveled gear 190 meshing with a beveled gear 191 carried by a shaft 192 journaled in brackets 193 and 194 mounted on the rear end of the frame 85. Shaft 192 drives a worm 195 meshing with a worm gear 196 which rotates a Geneva driving arm 197 carrying a roller 198 which cooperates with a Geneva gear driven wheel 199 fixed to the shaft 26. The gear ratio is such that shafts 166 and 192 are driven at the same speed and worm gears 170 and 196 are driven at the same speed therefore shaft 139 and its various cranks and cams will rotate once during every rotation of the Geneva driving arm 197. For every rotation of arm 197 shaft 26 will be rotated ⅙ revolution which is sufficient to cause the conveyor chain to move linearly the distance between the various tools 120 and 121 etc. and the various stationary workholders 80 shown in Fig. 4.

The various functions of the mechanism are so timed that, during the time when the workholder clamping jaws are separated which coincides with the time the various tools are retracted from the work, the conveyor is being moved a distance equal to the spacing between the tools. After the conveyor has stopped moving the oil pressure control valve is actuated by the cam 171 so as to connect the cylinders 95 with the source of fluid pressure in order to cause the workpieces T to be clamped firmly into position and into alignment with the various tools which operate upon them. Then after the tubes T have been clamped in the stationary workholder the tools advance simultaneously upon the ends of the tubes T and operations are performed thereon as shown in Figs. 13 to 16 inclusive. Then the tools are retracted, pressure is released from the cylinders 95 and the workpieces are unclamped from the stationary workholder. Then the conveyor chains 20 and 21 move the workpieces across the machine again the distance equal to the spacing of the tools. The machine being full of work, each time the conveyor moves, a new workpiece is fed to the first tool, namely tool 120 and a tube upon which the flaring is completed is fed away from the last tool 123 and is discharged from the machine following the automatic opening of a conveyor workholder clamping lever 60 as shown at 60a in Fig. 1.

While the tools shown in Figs. 13 to 16 inclusive, have been disclosed herein in order to show a typical series of tools which may be used in the present machine, it is to be understood that this machine is not limited to these particular tools, but that other tools may be substituted which are found more suitable to produce a particular type of flare on the end of the tube.

While the embodiment of the present invention as herein disclosed, constitutes a preferred form, it is to be understood that other forms might be adopted, all coming within the scope of the claims which follow.

What is claimed is as follows:

1. Apparatus for flaring tubing comprising, in combination, an endless chain conveyor carrying a plurality of workholders each for receiving a length of tubing, means for yieldingly holding the length of tubing on the conveyor workholder, a plurality of stationary workholders each for clamping a length of tubing adjacent its end to be flared, means for aligning the lengths of tubing with a plurality of tools for performing operations upon a plurality of lengths of tubing simultaneously, and an operating mechanism for causing the conveyor to move intermittently and for causing the stationary workholders to clamp lengths of tubing while the conveyor is at rest, the various tools to perform flaring operations upon the lengths of tubing and means for releasing the hold of the yielding means after the flaring operations have been completed to allow the tubes to fall by gravity from the conveyor.

2. An apparatus for flaring tubing comprising, in combination, a conveyor carrying a plurality of workholders each for receiving a length of tubing, means carried by the work-holders and manually operated for clamping a tube in position; a plurality of stationary work-holders each for clamping a length of tubing adjacent its end to be flared, a plurality of tools for performing operations upon a plurality of lengths of tubing simultaneously, operating mechanism for causing the conveyor to move at intervals and for causing the stationary work-holders to clamp the lengths of tubing in alignment with the tools while the conveyor is at rest, and the various tools to perform the flaring operations upon the length of tubing, means for freeing the lengths of tubing from the jaws of the stationary work-holders as the jaws separate and means for automatically releasing the manually operated clamping means of a conveyor work-holder after the flaring operations have been completed to permit the discharge of the tube from the work-holder.

3. An apparatus for flaring tubing comprising, in combination, a conveyor carrying a plurality of work-holders each for receiving a length of tubing, means carried by the work-holders and manually operated for clamping a tube in position; a plurality of stationary work-holders each for clamping a length of tubing adjacent its end to be flared, a plurality of tools for performing operations upon a plurality of lengths of tubing simultaneously, operating mechanism for causing the conveyor to move at intervals and for causing the stationary work-holders to clamp the lengths of tubing in alignment with the tools while the conveyor is at rest, and the various tools to perform the flaring operations upon the length of tubing, means for dislodging the tubes from contact with the stationary work-holders upon separation thereof; and means for automatically tripping the manually operated clamping means of a conveyor work-holder after the flaring operations have been completed to permit tne tubing to drop by gravity from the conveyor work-holder.

4. An apparatus for flaring tubing comprising, in combination, a conveyor carrying a plurality of work-holders each for receiving a length of tubing, a spring-urged lever carried by the workholders and manually operated for clamping a tube in position, a plurality of stationary workholders comprising an upper and a lower jaw for clamping a length of tubing adjacent its end to be flared, a plurality of tools for performing operations upon a plurality of lengths of tubing simultaneously, operating mechanism for moving the conveyor intermittently and for moving one of the jaws to clamp the lengths of tubing while the conveyor is at rest and the various tools to perform flaring operations upon the lengths of tubing, and means located in the path of the spring-urged levers to automatically move a lever in a non-clamping position after the flaring operations have been complete to permit the discharge of a tube from the work-holder.

5. An apparatus for flaring tubing comprising, in combination, a conveyor carrying a plurality of work-holders each for receiving a length of tubing, means carried by the work-holders and manually operated for clamping a tube in position, a plurality of upper and lower gripping members, a plurality of tools for performing operations upon a plurality of lengths of tubing simultaneously, operating mechanism for causing the conveyor to move intermittently and causing the lower gripping member to elevate the lengths of tubing to the upper gripping members to clamp the tubes in alignment with tools while the conveyor is at rest, and the various tools to perform flaring operations upon the lengths of tubing, and means for automatically releasing the tube clamping means of a conveyor work-holder after the flaring operations have been completed.

6. An apparatus for flaring tubing comprising, in combination, an endless chain conveyor; work-holders carried by the conveyor for receiving a tube each having means for clamping the tube in position, a plurality of stationary work-holders comprising normally separated clamping members, means for positioning a tube between the clamping members, a plurality of tools for performing operations upon a plurality of lengths of tubing simultaneously, operating mechanism for causing the conveyor to move intermittently and for causing the clamping members to clamp the lengths of tubing in alignment with the various tools which operate upon them while the conveyor is at rest and the various tools to perform operations upon the lengths of tubing, and means adapted to be engaged by the clamping means of a conveyor work-holder to cause a tripping of the clamping means to permit the discharge of the tube from the work-holder.

7. An appaartus for flaring tubes, comprising a conveyor adapted to support a plurality of tubes to be flared, a plurality of different tools located in different positions for performing separate operations upon the tubes simultaneously means for moving the conveyor step-by-step to bring each of the tubes into position to be operated on by one of the tools, means for clamping the tubes simultaneously in axial alignment with the tools while the conveyor is at rest, and means for operating all the tools simultaneously while the tubes are clamped.

8. An apparatus for flaring tubes comprising an endless chain conveyor adapted to support a plurality of different lengths of tubes, a plurality of different tools including longitudinal reciprocating tools and longitudinal reciprocating rotating tools, means operating the conveyor step-by-step to bring each tube into position to be operated on by the tools successively, power means for operating the tools, pressure actuated means for clamping the tubes in a stationary position while the tools are operated.

9. An apparatus for flaring tubes comprising an endless conveyor, manually operated means for holding yieldingly tubes in position on the conveyor, a plurality of work-holders for clamping a tube adjacent its end to be flared, a plurality of different tools in cooperative relation with the work-holders, said tools including a deforming tool, an internal trimming tool, an external trimming tool and a coining tool, means for operating the conveyor step-by-step to bring any tube thereon successively into position to be operated on by said tools and a plurality of the tubes into position to be operated on by all of the tools simultaneously, pressure actuated means for operating all of the work-holders into a clamping position simultaneously, means for operating all of the tools simultaneously and means for automatically releasing the clamping effect of the manually operated means to permit the discharge of the tube from the conveyor.

10. An apparatus for flaring tubing comprising, in combination; an endless chain conveyor; work-holders carried by the conveyor for receiving a tube, each having means for clamping the tube in position; a plurality of stationary work-holders comprising normally separated clamping members; a plurality of tools for performing operations upon a plurality of lengths of tubing simultaneously; operating mechanism for causing the conveyor to move intermittently, and for causing the clamping members to clamp the length of tubing in alignment with the various tools which operate upon them while the conveyor is at rest, and for causing the various tools to perform operations upon the lengths of tubing; ejecting means carried by the stationary work-holders for dislodging the tubes from contact with the work-holders upon separation thereof; and means adapted to be engaged by the clamping means of a conveyor work-holder to release the clamping effect thereof permitting the discharge of the tube from the work-holder.

11. An apparatus for flaring tubing comprising, in combination; an endless chain conveyor; work-holders carried by the conveyor for receiving a tube, each having means for clamping the tube in position; a plurality of stationary work-holders comprising normally separated clamping members; a plurality of tools for performing operations upon a plurality of lengths of tubing simultaneously; operating mechanism for causing the conveyor to move intermittently, and for causing the clamping members to clamp the lengths of tubing in alignment with the various tools which operate upon them while the conveyor is at rest, and for causing the various tools to perform operations upon the lengths of tubing; ejecting means for dislodging the tubes from contact with one of the work-holders upon separation thereof; and means adapted to be engaged by the clamping means of a conveyor work-holder to cause a tripping of the clamping means to permit the discharge of the tube from the conveyor work-holder.

12. An apparatus for flaring tubing comprising, in combination; a conveyor carrying a plurality of work-holders each for receiving a length of tubing; a spring-urged lever carried by the work-holders and manually operated for clamping a tube in position on said work-holder; a plurality of stationary work-holders each comprising an upper and a lower jaw for clamping a length of tubing adjacent its end to be flared; means for positioning a tube between the jaws; a plurality of tools for performing operations upon a plurality of lengths of tubing simultaneously; operating mechanism for moving the conveyor intermittently, and for moving one of the jaws to clamp the lengths of tubing while the conveyor is at rest and for causing the various tools to perform flaring operations upon the lengths of tubing; and means for moving the spring urged levers to a non-clamping position after the flaring operations have been complete to permit the discharge of a tube from the conveyor work-holder.

13. An apparatus for flaring tubing comprising, in combination; an endless chain conveyor; yieldable means carried by the conveyor for supporting various lengths of tubes in a spaced relation on the conveyor; a plurality of work-holders comprising normally separated clamping members; a plurality of tools for performing operations upon a plurality of lengths of tubing simultaneously; operating mechanisms for causing the conveyor to move intermittently; pressure actuated means for causing the clamping members to hold firmly the lengths of tubing in alignment with the various tools, while the conveyor is at rest; power means for reciprocating the tools to perform operations upon the lengths of tubing; ejecting means associated with the work-holders and operable for dislodging the tubes from contact with the clamping members as the clamping members separate; and means cooperating with the yieldable means on the conveyor to release the hold thereof after the flaring operations have been completed to permit the discharge of the tubes from the conveyor.

LORA E. POOLE.
CHARLES A. NICHOLS.